UNITED STATES PATENT OFFICE.

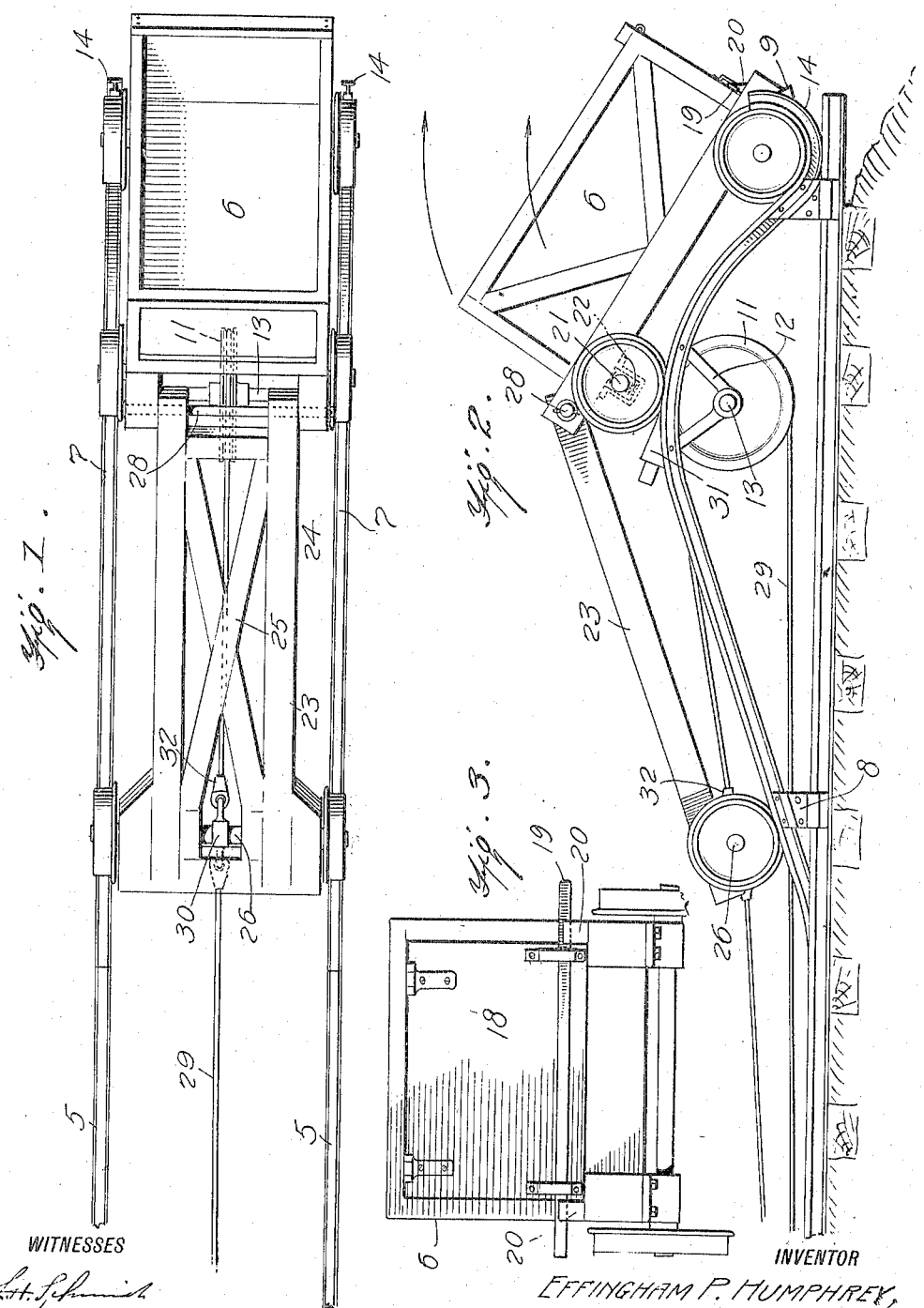

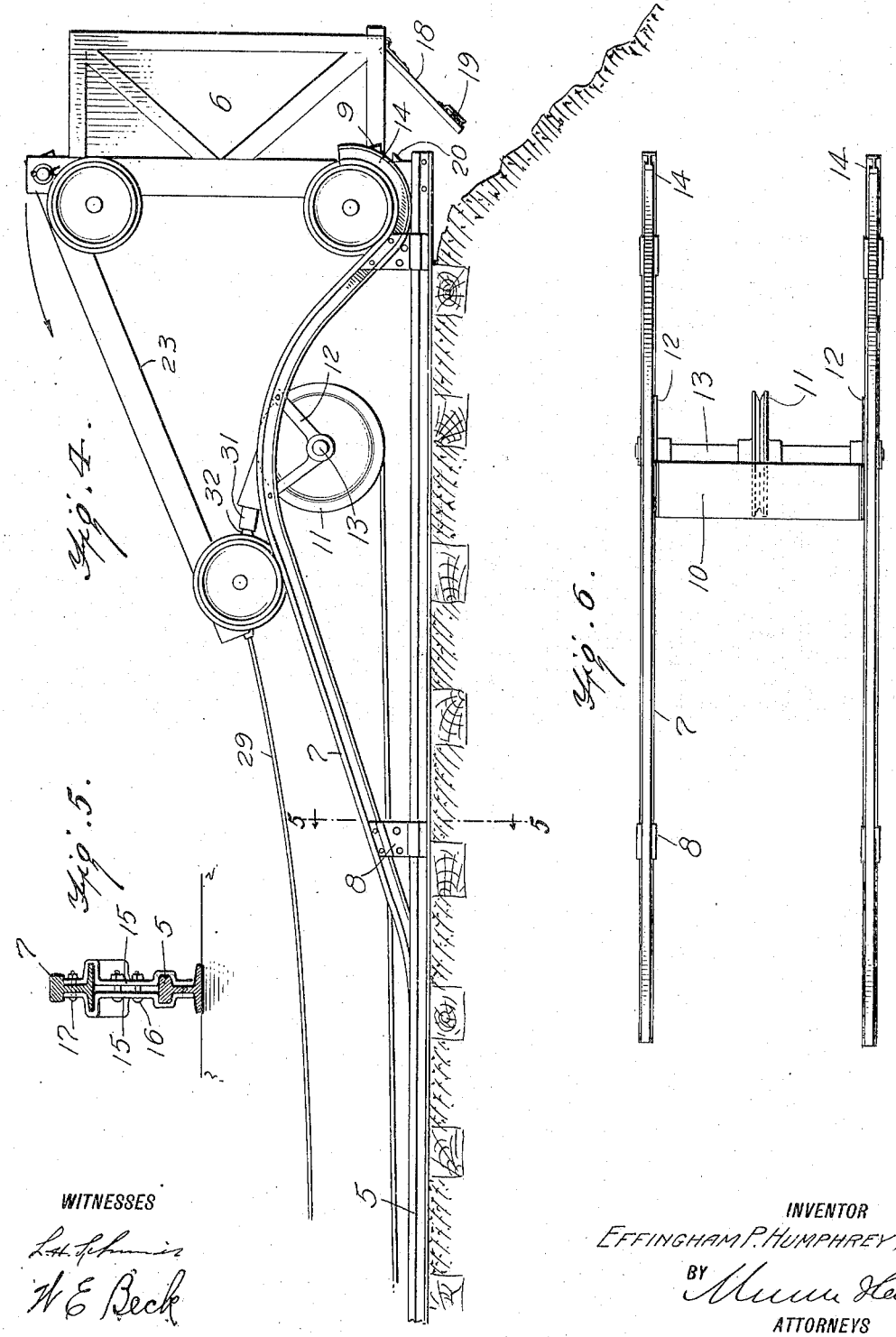

EFFINGHAM PEROT HUMPHREY, OF WILKES-BARRE, PENNSYLVANIA.

CAR HOISTING AND DUMPING DEVICE.

1,321,826.            Specification of Letters Patent.        Patented Nov. 18, 1919.

Application filed December 15, 1916, Serial No. 137,156. Renewed May 2, 1919. Serial No. 294,346.

*To all whom it may concern:*

Be it known that I, EFFINGHAM PEROT HUMPHREY, a citizen of the United States, and a resident of Wilkes-Barre, in the county of Luzerne and State of Pennsylvania, have invented a certain new and useful Improvement in Car Hoisting and Dumping Devices, of which the following is a specification.

One of the principal objects of my invention is to provide an improved means operable with equal success on a grade or on the level for hoisting and dumping a car or allied vehicle, and returning the car to its point of departure.

Another object of the invention resides in the provision of an auxiliary track frame adapted to be mounted on the stock rails of the track and upon which the car is adapted to be run for initiating an angular inclination to the car preparatory to dumping the same.

A further object resides in the provision of an elevating truck, hingedly connected with the car, and movable over the track therewith, and operating to continue the angular movement of the car, imparted by the auxiliary track frame, into final dumping position.

Another object of my invention is to provide the auxiliary track frame with suitable means for hoisting and lowering the car; with means for properly checking the hoisting movement of the car; and with means for tripping the release latch of the car as the latter assumes dumping position.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1 represents a top plan view of a car hoisting and dumping device constructed according to my invention;

Fig. 2 represents a side elevational view thereof;

Fig. 3 represents an end elevational view of the car;

Fig. 4 represents a view similar to Fig. 2, showing the car in dumping position;

Fig. 5 represents a view in section taken on the plane indicated by the line 5—5 of Fig. 4, looking in the direction indicated by the arrows;

Fig. 6 represents a top plan view of the auxiliary track frame.

The apparatus works with equal efficiency whether upon a level track or upon a grade, and in carrying the invention into practice the track including the stock rails 5, is laid directly on the dump pile, on the ground, or upon a suitable trestle, as the case may be, and terminates at its outer end at the point where the dump car, indicated at 6, is to be emptied.

Upon the track rails adjacent the outer terminals thereof, is superposed the auxiliary track frame which includes the rails 7; clamps 8; trip lugs 9; brace 10 connecting the rails 7; sheave or pulley 11; and the sheave hanger consisting of the frames 12, supported by the rails and which carry the shaft 13 on which the sheave or pulley is mounted.

The rails 7 are bowed upwardly along the portion intermediate their ends, and at their inner ends are tapered so as to fit upon the stock rails 5 and present therewith an uninterrupted traction surface for the dump car wheels. The outer ends of rails 7 are hooked or curved upwardly as at 14, to provide immovable horns for receiving the forward car wheels and supporting them while the car is being dumped. The clamps 8 which detachably connect the auxiliary rails with the stock rails are positioned near the opposite ends of the auxiliary rails, and include the oppositely channeled plates 15, see Fig. 5, connected to each other by bolts 16 and to the auxiliary rail webs by bolts 17. The upper and lower channeled portions of the plates engage respectively the base flanges of the auxiliary rails and the heads of the stock rails, as clearly shown.

By loosening bolts 15 the clamp plates may be swung apart for detachment from the stock rails whereby to allow removal of the auxiliary track frame.

The dump car includes the usual truck and body, the latter being provided at its outer end with a door 18 hingedly connected along its upper edge with the body of the car, and this door carries a vertically movable cross bar or latch 19, engaged, when in door retaining position, in grooves in the tops of car carried blocks 20. As the car moves into final dumping position, indicated in Fig. 4, the latch is raised, by the cam action of the inclined upper surfaces of lugs 9, into door releasing position so that the contents of the car may slide therefrom, as will be understood. The rear axle 21 of the car truck may be equipped with suitable spring journals 22 to take up the shock as the rear wheels strike the rails 7, when the car is being lowered from dumping position.

To the rear end of the car truck is pivotally connected the elevating truck indicated generally at 23. This truck includes a frame comprising side bars 24 and suitable braces 25; an axle 26, arranged adjacent the rear end of the frame; and wheels 27 carried by the axle and adapted to run on the trackway. The forward ends of the side bars 24 are pivotally connected with the rear portion of the car truck through the medium of a rod or bolt 28.

Over the sheave 11 and extending centrally along the trackway, runs a cable 29 which is driven by a suitable motor or engine, not shown, and this cable is connected by means of a suitable bearing 30 with the axle 26 of the elevating truck. It will be understood that, when the cable is driven in one direction, the car, together with its elevating truck, will be propelled upwardly along the trackway and onto the auxiliary track-frame, and when driven in an opposite direction the apparatus will be drawn in a reverse direction along the trackway to its point of departure.

In order that an overhoist of the dump car may be prevented, an adjustable horn stop 31 of any desirable type is mounted, preferably on the cross brace 10 of the auxiliary track frame, and this horn stop is adapted to be engaged by a suitable spring clamp indicated conventionally at 32, mounted upon the cable 29.

The operation of the device may be briefly described as follows: The car having been loaded at its point of departure, is drawn upwardly along the stock rails 5, through the operation of the hoisting cable 29, and moves up onto the auxiliary track frame until the forward wheels of the car are engaged by the upturned or hooked ends 14 of the rails 7. This position of the apparatus having been assumed, as indicated in Fig. 2, the car will have been inclined so that its rear wheels are considerably above the front wheels, and the floor of the car will have moved into a position for throwing the weight of the material within the car toward the end on which the door 18 is mounted. A continued pull upon the cable 29 will result in the elevating truck 23 moving upwardly upon the rails 7, until the spring stop 32 will have engaged against the horn 31, such movement of the truck having operated to raise the rear wheels of the dump car off of the track and to move the dump car into dumping position, as indicated in Fig. 4. As the dump car is moved into its ultimate dumping position, the latch or bar 19 will be shifted upwardly by the cam action of the lugs 9 whereby to release the door 18, so that the contents of the car will slide out through the open car end. The car having been dumped, a reverse pull will be imparted to the cable whereby to move the truck 23 downwardly along the rails 7 and bring the car into position indicated in Fig. 2. The shock sustained by the car, as it drops back into such position, is taken up by the spring journals 22 with which the rear car axle 21 is equipped. The car may then be drawn back to be refilled.

It will be understood that, where the track 5 is laid upon a surface which slopes upwardly, the truck 23 and car 6 will move from the dumping position into the position indicated in Fig. 2, by the action of gravity, such movement being allowed by relaxing the tension upon the hoisting cable, and in such instances the car may be allowed to run back to the point of departure simply through the action of gravity, so that the double cable shown in the drawing may, in such cases, be dispensed with, and only a single cable, for hoisting the car, be used.

Although I have described the preferred embodiment of my invention, I may desire to make such changes in the construction, combination, and arrangement of parts thereof, as do not depart from the spirit of the invention and the scope of the appended claims.

I claim:—

1. In a car hoisting and dumping apparatus, a main track, an auxiliary track frame superposed on the main trackway, said auxiliary track frame including spaced rails having upwardly bowed central portions and having their outer terminals curved upwardly for receiving and checking the forward wheels of a dump car, the inner ends of the bowed rails forming a continuous traction surface with the main rails of the trackway, a dump car arranged for travel along the main rails, an elevating truck also arranged to travel on the main rails and being pivotally connected with the dump car, means for moving the dump car and elevating truck onto the auxiliary track rails, and means for limiting the movement of the lifting truck along the auxiliary track rails.

2. In a car elevating and dumping apparatus, the combination with a main trackway and a dump car adapted for travel thereon, of an auxiliary track superposed upon the main trackway, including rails having upwardly bowed central portions and having their outer terminals bent upwardly whereby to receive and check the movement of the forward wheels of the said car, an elevating truck mounted for travel along the trackway, said elevating truck being pivotally connected at its forward end with the rear end of the dump car, a sheave carried by the auxiliary track, a cable running over said sheave and connected with the elevating truck for actuating the latter, and means whereby the movement of the elevating truck along the auxiliary trackway may be limited.

3. In a car hoisting and dumping apparatus, the combination with the main track, and a dumping car movable thereon and including a delivery door and a latch for controlling said door, of an elevating truck mounted for travel along the trackway and pivotally connected with the dump car, means for moving the elevating truck along the trackway, an auxiliary trackway mounted on the main trackway and having bowed rails upon which the dump car is adapted to be moved whereby to incline said car, for initiating its movement into dumping position, and means carried by the auxiliary trackway for moving the latch into door-releasing position as the car attains final dumping position.

4. In a car hoisting and dumping apparatus, the combination with the main track, and a dumping car movable therealong, of an elevating truck movable along the main track and being pivotally connected with the dumping car for hoisting the latter into dumping position, an auxiliary track mounted upon the main track and including bowed rails superposed on the main track-rails for initiating the movement of the dump car into dumping position, said auxiliary track having means for receiving and arresting the movement of the forward car wheels, substantially as described.

5. In a car hoisting and dumping apparatus, the combination with a main trackway, of an auxiliary track frame mounted thereon, said auxiliary track frame including spaced and upwardly bowed auxiliary rails superposed on the main track rails, said auxiliary rails having their outer extremities curved upwardly to provide means for arresting the movement of a dump car, and means for detachably connecting the auxiliary track frame with the main trackway.

6. In a device of the class described, the combination with a main trackway, of an auxiliary trackway including spaced rails mounted upon the rails of the main trackway, said spaced rails having their central portions bowed upwardly whereby to initiate the movement of a dump car into dumping position, means carried by the spaced rails for coaction with the release mechanism of a dump car, and means for detachably connecting the auxiliary trackway with the main trackway.

7. The combination with a main trackway, of spaced auxiliary rails superposed on the rails of the main trackway, said auxiliary rails having curved portions for receiving the forward wheels of a dumping car and for checking the forward movement of said car, said auxiliary rails further having bowed portions whereby to initiate a movement of the dumping car into dumping position, and means for detachably connecting the auxiliary rails with the main rails of the trackway.

8. In a car hoisting and dumping apparatus, the combination of a main trackway, a dump car movable therealong, a hoisting truck connected with the dump car and movable along the trackway and adapted to move the dump car into final dumping position, and an auxiliary trackway upon which the dump car is adapted to be moved, said auxiliary trackway including bowed rails superimposed upon the main rails of the trackway for initiating the movement of the car into dumping position.

9. In a device of the class described, the combination with a main trackway, of an auxiliary trackway including bowed rails mounted upon the rails of the main trackway and adapted to initiate the movement of a dump car into dumping position, said auxiliary trackway having means for arresting the movement of a dump car.

EFFINGHAM PEROT HUMPHREY.